US008661252B2

(12) United States Patent
Chandwani

(10) Patent No.: US 8,661,252 B2
(45) Date of Patent: Feb. 25, 2014

(54) SECURE NETWORK ADDRESS PROVISIONING

(75) Inventor: Santosh Chandwani, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1323 days.

(21) Appl. No.: 12/143,655

(22) Filed: Jun. 20, 2008

(65) Prior Publication Data
US 2010/0017597 A1   Jan. 21, 2010

(51) Int. Cl.
G06F 7/04    (2006.01)
G06F 17/30   (2006.01)
H04L 29/06   (2006.01)
H04L 9/32    (2006.01)
H04N 7/16    (2011.01)

(52) U.S. Cl.
USPC ............. 713/168; 713/156; 726/27; 726/29

(58) Field of Classification Search
USPC .......................................................... 726/6
See application file for complete search history.

(56) References Cited

U.S. PATENT DOCUMENTS

| 5,884,024 | A | 3/1999 | Lim |
| 6,393,484 | B1 | 5/2002 | Massarani |
| 7,028,337 | B2 | 4/2006 | Murakawa |
| 7,035,917 | B2 | 4/2006 | Yamasita |
| 7,636,938 | B2 * | 12/2009 | Mayfield et al. .................. 726/5 |
| 8,001,610 | B1 * | 8/2011 | Chickering et al. ............ 726/27 |
| 2002/0038420 | A1 * | 3/2002 | Collins et al. ................. 713/156 |
| 2003/0028650 | A1 | 2/2003 | Chen |
| 2004/0103310 | A1 * | 5/2004 | Sobel et al. ................... 713/201 |
| 2005/0005154 | A1 | 1/2005 | Danforth |
| 2006/0036733 | A1 | 2/2006 | Fujimoto |
| 2006/0047826 | A1 * | 3/2006 | Cromer et al. ................ 709/229 |
| 2006/0123118 | A1 | 6/2006 | Choe |
| 2006/0274768 | A1 | 12/2006 | Suzuki |
| 2007/0061458 | A1 | 3/2007 | Lum |

FOREIGN PATENT DOCUMENTS

EP   1434404 A1   6/2004

OTHER PUBLICATIONS

RFC 4568, Session Description Protocol (SDO) Security Descriptions for Media Streams, Jul. 2006, Retrieved from the internet <URL: tools.ietf.org/html/rfc4568>, pp. 1-45 as printed.*
DHCP, Security Architecture for DHCP, Jul. 1997, Retrieved from the internet <URL: tools.ietf.org/pdf/draft-ietf-dhc-security-arch-01.pdf>, pp. 1-14 as printed.*
DHCP, RFC 2131 Dynamic Host Configuration Protocol, 1997, Retrieved from the internet <URL: ietf.org/rfc/rfc2131.txt.pdf>, pp. 1-45 as printed.*

(Continued)

Primary Examiner — Saleh Najjar
Assistant Examiner — Feliciano Mejia
(74) Attorney, Agent, or Firm — Andrew Sanders; Micky Minhas

(57) ABSTRACT

A network in which a client receives a network credential, such as a valid network address, following an exchange of messages with a credential server that includes security information. The security information may validate the credential, avoiding rogue devices inadvertently or maliciously distributing credential information that can interfere with clients attempting to connect to the network or with the network itself. If obtaining a network credential requires an exchange of information about the configuration of the client that could reveal security vulnerabilities, the security information may be used to ensure the confidentiality of that configuration information. The security information may be incorporated into messages according to a known protocol, such as by incorporating it into options fields of DHCP messages.

20 Claims, 10 Drawing Sheets

(56) References Cited

OTHER PUBLICATIONS

Droms, R., "Automated Configuration of TCP/IP With DHCP", *IEEE Internet Computing*, Jul.-Aug. 1999, pp. 45-53.

"DHCP Secured IP Address Assignment", http://www.cisco.com/en/US/products/iosswrel/ps1839/products_feature_guide09186a00801543c8.html, printed Jun. 8, 2007, 10 pgs.

"Implementing Dynamic Host Configuration Protocol (DHCP)", http://www.rkimr.epn.ba/W2k%20net%20-%20Chapter10%20DHCP.pdf, p. 1-30. downloaded Jun. 8, 2008.

Hull et al., "Next Generation DHCP Deployments", http://www.nts.ku.edu/about/projects/dhcp/NGDHCP.pdf, Feb. 2005, pp. 28-33.

Droms, R., "Dynamic Hose Configuration Protocol", http://www.ietf.org/rfc/rfc2131.txt, Mar. 1997, pp. 1-45.

Alexander, S., "DHCP Options and BOOTP Vendor Extensions", http://www.ietf.org/rfc/rfc2132.txt, Mar. 1997, pp. 1-34.

Droms, R. et al., "RFC 3315—Dynamic Host Configuration Protocol for IPv6 (DHCPv6)", http://www.faqs.org/rfcs/rfc3315.html, Jul. 2003, pp. 1-65.

European Search Report from EP Application No. 05111673.9, 7 pps.

Jayaraman, P. et al., "PANA Framework", *PANA Working Group*, Jan. 2005, pp. 1-46.

Gudmundsson, O., "Security Architecture for DHCP", *Dynamic Hose Configuration WG*, Jul. 30, 1997, pp. 1-14.

\* cited by examiner

SECURE NETWORK ADDRESS PROVISIONING

BACKGROUND

For a computing device to operate on a network, it must have a valid network address so that information can be routed to the device. In many networks, addresses are assigned dynamically by an access control server as devices seek to connect to the network. The access control server may use the Dynamic Host Configuration Protocol (DHCP), which is implemented by many networks and provides a mechanism for a device to obtain a network address.

DHCP has been defined for both IPv4 and IPv6 and it specifies a series of messages that can be exchanged between a device and a DHCP server to provision a device with a network address. By using these messages, a device connecting to a network, can locate a DHCP server on the network and request an address appropriate for use on that network. Conversely, the DHCP server can receive and process the request and, in response, provide a network address to the device.

In addition to enabling a device to connect to a network, a network address may also serve as a form of network credential, allowing only devices that have received that credential to communicate over the network. Microsoft Corporation provides a product, called Network Access Protection™, which enhances network security by limiting the distribution of network addresses to only those devices that have a security configuration that complies with a network access policy set by a network administrator. For example, a DHCP server may decline to give a network address to a device with an out-of-date or mis-configured firewall or anti-virus software, preventing that device from acting as a point of attack on the network or infecting the network with a virus.

In the Network Access Protection™ product, a device seeking access to a network provides a "statement of health," which contains information about the configuration of the device as it relates to vulnerabilities of the device or a network to which that device may connect. For example, the statement of health may indicate the brand and version of anti-virus software in use on the device. Other information in the statement of health may indicate whether a firewall in the device is enabled and settings of the firewall.

An access control server, which may be a DHCP server, compares the statement of health to an access policy set by a network administrator. If the statement of health complies with the policy, the access control server may provide a network address to allow the device to access the network. Conversely, if the statement of health indicates the device is out of compliance with the network access policy, the access control server may simply decline to provide a network address or may provide remediation information, which the device can use to upgrade its software, adjust settings of protective components or otherwise become compliant with the network access policy.

In another application, a network administrator may modify some of the configuration parameters for the network. The DHCP protocol provides for a Reconfigure option that a DHCP server may use to notify the clients on the network to discard their current network configuration information and obtain an updated network configuration from the server. This option can make the client vulnerable to attack by a rogue server, which can force clients on the network to modify their network configuration. The Reconfigure option is hence not recommended for use without a security mechanism that permits the client to validate that the Reconfigure request originates at a trusted DHCP server and is authorized by the network administrator.

SUMMARY

The process of obtaining network credentials for a client is vulnerable to eavesdropping, denial of service and information tampering attacks. To reduce the network and client vulnerabilities in the process of provisioning the client with a network credential, such as a network address or a DNS server address, security information may be incorporated into messages exchanged as part of the client obtaining the network credential. The security information may provide confidentiality and/or authentication for information exchanged as part of the provisioning process. By using the security information for authentication, a device may validate that the source of the credential is authorized to provide the credential, which precludes network problems that arise when devices improperly receive credentials from rogue servers. In cases where the client has to demonstrate that it qualifies for access to the network based on its health, the security information can provide confidentiality, which precludes unauthorized third parties from gaining access to configuration information relating to vulnerabilities communicated between the client and a credential server.

The security information may be communicated in messages between a client and a credential server and may take different forms in different embodiments. In some embodiments, the security information may be in the form of a certificate or a token that can be used to encrypt or sign information. Alternatively or additionally, the security information may include a replay detection token or other security devices.

The security information may be incorporated into messages exchanged according to a known protocol for gaining access to a network. In embodiments using DHCP, the security information may be conveyed in options fields of DHCP messages, either by inserting the security information into those fields or encrypting or signing information in those fields. The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
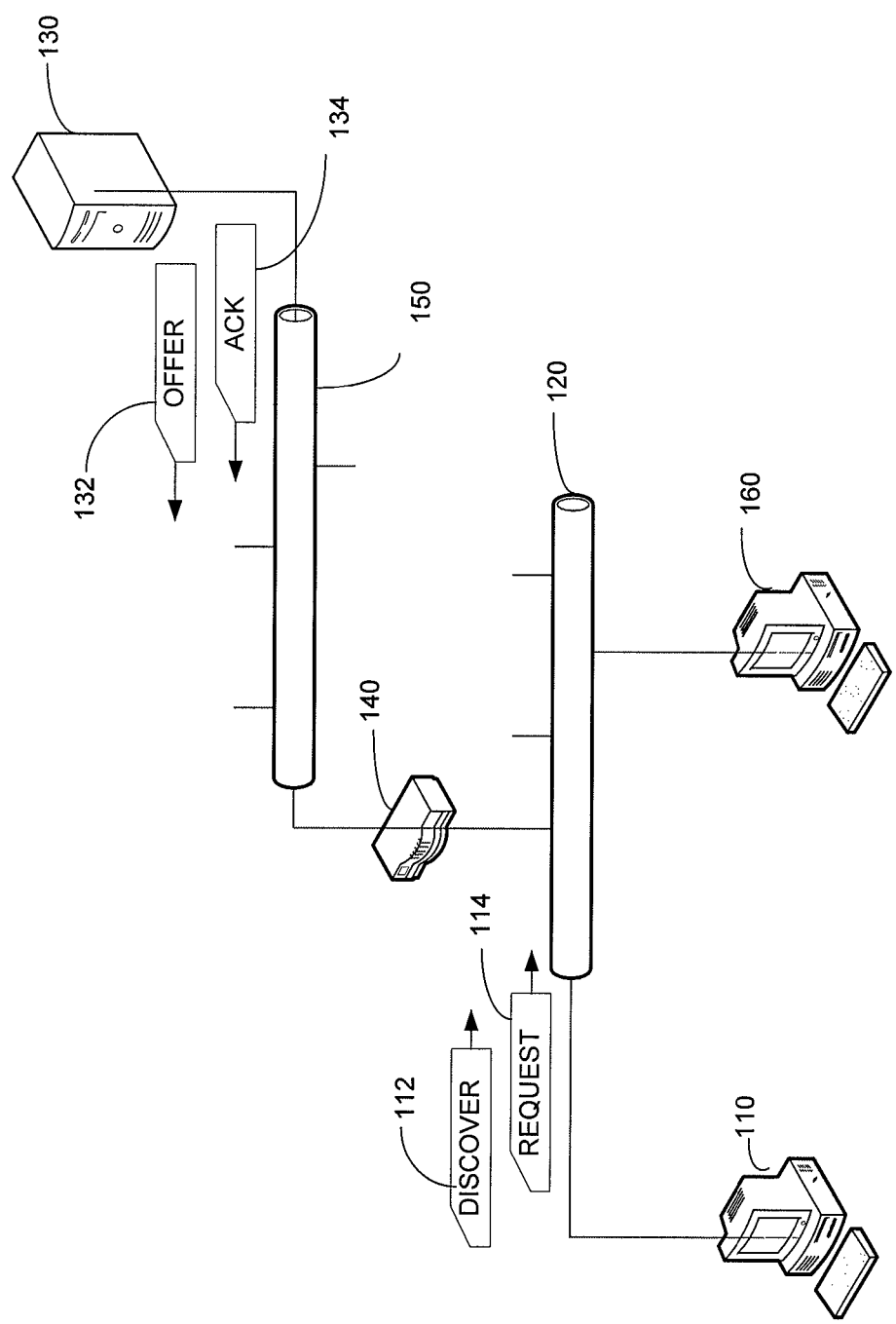
FIG. 1 is a sketch of a network environment in which an embodiment of the invention may be employed.

The inventor has appreciated that network or client device security can be enhanced by incorporating security information into an exchange of messages through which a client is provisioned with a network address or other network credential. Even though a client may publicize its network address or other network credential once assigned, applying encryption or authentication to information exchanged as part of obtaining the credential may improve overall network or client security.

Improved security may result from preventing a rogue device operated for malicious purposes from obtaining information that reveals a vulnerability to which the client is susceptible. The vulnerability may relate directly to the client or may be a network vulnerability created when the client is provided with access to the network. For example, in networks in which clients must disclose the state of protective software or hardware components to demonstrate their qualification for access in order to obtain network credentials, that state information may be intercepted and used maliciously to exploit a security vulnerability of the client. Similarly, remediation information sent to a client that is out of compliance with a network access policy, if intercepted, may also reveal a vulnerability of the client. Using encryption to exchange configuration or remediation information may prevent such vulnerabilities from being exploited.

Improved security may also result if the client can be prevented from attempting to use an invalid network credential provided, whether unintentionally or maliciously, by a rogue device. A client configured with invalid network credentials may be unable to access the network, thereby disrupting operation of the client. If multiple clients attempt to access a network with invalid credentials, the network may be flooded with invalid messages, thereby disrupting network operations. Security information exchanged during the process of provisioning a client with a network credential, such as a network address, may allow a client to validate that a network address or other credential it receives was generated by an authorized credential server, reducing the risk that a rogue device can propagate invalid network credentials.

In some embodiments, the security information is incorporated into messages according to a known or standardized protocol for provisioning a client with network credentials. The security information may be stored in or applied to information in options fields defined by such a protocol. As a client and a credential server exchange information according to the protocol, the devices may also exchange security information without departing from the standardized protocol.

Moreover, because security information is included in options fields, a network may be configured to allow a client or a credential server that is not adapted to generate or use the security information to nonetheless obtain or provide network credentials. To accommodate interoperability of devices that do and do not employ the security information, options fields may also be used for clients or credential servers to signal their capability and to negotiate the use of security information.

In the description that follows, DHCP is used as an example of a standardized protocol that supports the exchange of security information as part of provisioning a client with a network credential. In this example, the network credential is a network address. However, any suitable protocol, whether or not standardized, and any suitable network credential may be used.

FIG. 1 illustrates a network environment in which an embodiment of the invention may be employed. The environment of FIG. 1 includes a protected network 150 to which a client 110 attempts to gain access. Client 110 is connected to access network 120 that may be coupled to a protected network 150 through router 140. Here, router 140 acts as an access control device, only allowing general messages to pass between protected network 150 and access network 120 if the messages are to or from a client device that is authorized to access protected network 150.

Router 140 may identify a client authorized to access protected network 150 based on credentials assigned to the client. The access credential may be in any suitable form. However, in the embodiment illustrated, valid network addresses act as credentials, and only devices authorized to access protected network 150 are provided with valid network addresses.

In the embodiment illustrated, valid network addresses are provided dynamically by a credential server. In the embodiment illustrated, DHCP server 130 acts as a credential server. It assigns a valid network address to a client requesting network access if DHCP server 130 can validate that the client is authorized to access protected network 150.

According to the DHCP, client 110 and DHCP server 130 exchange a series of messages, allowing DHCP server to authenticate client 110. Any suitable message format may be used. However, in the embodiment illustrated, client 110 and DHCP server 130 exchange messages according to Internet standards RFC 2131 and 2132. Such messages are frequently used in conjunction with networks operating according to IPv4. In embodiments in which the network operates according to IPv6, the messages exchanged between client 110 and DHCP server 130 may be in accordance with Internet standard RFC 3315.

In the embodiment of FIG. 1, messages 112, 114, 132 and 134 are shown communicated between client 110 and DHCP server 130. The specific number of messages exchanged is not a limitation on the invention and any suitable number may be used. Also, the specific types and names of the messages are not limitations on the invention. In the embodiment illustrated, message names in accordance with an IPv4 protocol are used as examples. These names should be interpreted broadly to encompass similar messages with other names in accordance with other protocols.

For example, message 112 is termed a "discover" message. A comparable message in IPv6 may be termed a "solicit" message, but the term "discover" is intended to be interpreted broadly so as to encompass both "discover" and "solicit" messages and other similar messages in other protocols. Similarly, message 132 is termed an "offer" message, which is a term used in conjunction with IPv4, but the term is intended to be interpreted broadly to encompass an "advertise" message in accordance with IPv6 and other similar messages in other protocols. Likewise, the term "request" used in conjunction with message 114 is intended to be interpreted broadly to encompass "request" messages in IPv6 or other similar messages in other protocols, and the term "ACK" used in conjunction with message 134 is also intended to be interpreted broadly so as to encompass "reply" messages in IPv6 and other similar messages in other protocols.

Regardless of the terminology used for the specific messages exchanged between client 110 and DHCP server 130, the messages may be exchanged in an order that allows client 110 to identify DHCP server 130 and request a network address. The messages allow DHCP server 130 to authenticate client 110 and provide a valid network address.

In the embodiment illustrated, the exchange of messages begins with client 110 sending discover message 112. Though other messages to or from client 110 may be blocked by router 140, router 140 passes provisioning messages, allowing the discover message 112 to reach DHCP 130. In response to the discover message 112, DHCP sever 130 sends an offer message 132. As with the discover message 112, the offer message 132 passes through router 140, allowing it to reach client 110. In response, client 110 sends the request message 114 to DHCP server 130. When DHCP server 130 validates client 110, it responds with the ACK message 134, including network credentials, which in the example illustrated are a network address for client 110. As a result of this exchange of messages, client 110 gains access to secure network 150.

The inventor has appreciated certain security risks created through the exchange of messages according to DHCP. In the example of FIG. 1, DHCP server 130 is an authorized credential server and only provides valid network addresses. However, a rogue device, such as rogue device 160, connected to either network 120 or protected network 150 may receive one or more of the message 112, 114, 132 and 134. Such a rogue device may be maliciously or unintentionally coupled to a network. For example, a device authorized for connection to the network may be unintentionally configured to respond to a DHCP discovery or request message. Though not configured for malicious purposes, such a device may provide client 110 with an invalid network address.

A device that receives an invalid network address from a rogue device and attempts uses it be unable to communicate over the network. If numerous devices receive invalid addresses and attempt to use them for network communications, the network may be flooded with invalidly formatted messages. If a sufficient number of devices become configured with invalid addresses, the network may become so congested that valid network traffic is disrupted. The inventors have appreciated improvements in network security can be achieved by incorporating authentication into the messages exchanged between a client and a credential server for the purpose of obtaining credentials for a network client. Such security information may allow the network client to validate that the credentials are being provided by an authorized credential server.

Another problem that may arise from a rogue device is that the rogue device may intercept information exchanged between the client and the credential server and misuse it. For example, in networks in which a client is required to provide configuration information before being provided with network credentials, a rogue device may intercept a message containing that configuration information and use it to detect vulnerabilities of either the client or the network once the client is provided with access. For example, if a rogue device intercepts a statement of health generated by a network client, the rogue device may be able to infer that the network client lacks up-to-date anti-virus software or a firewall adequate to protect the client from attack. The rogue device may then infect the client device with a virus or obtain access to the network client or to protected network 150 through the client by exploiting the vulnerabilities in the client 110. The inventor has appreciated that encrypting configuration information exchanged between client 110 and DHCP server 130 may increase the overall security of client 110 or protected network 150 by precluding a rogue device from obtaining configuration information.

Figure 2:
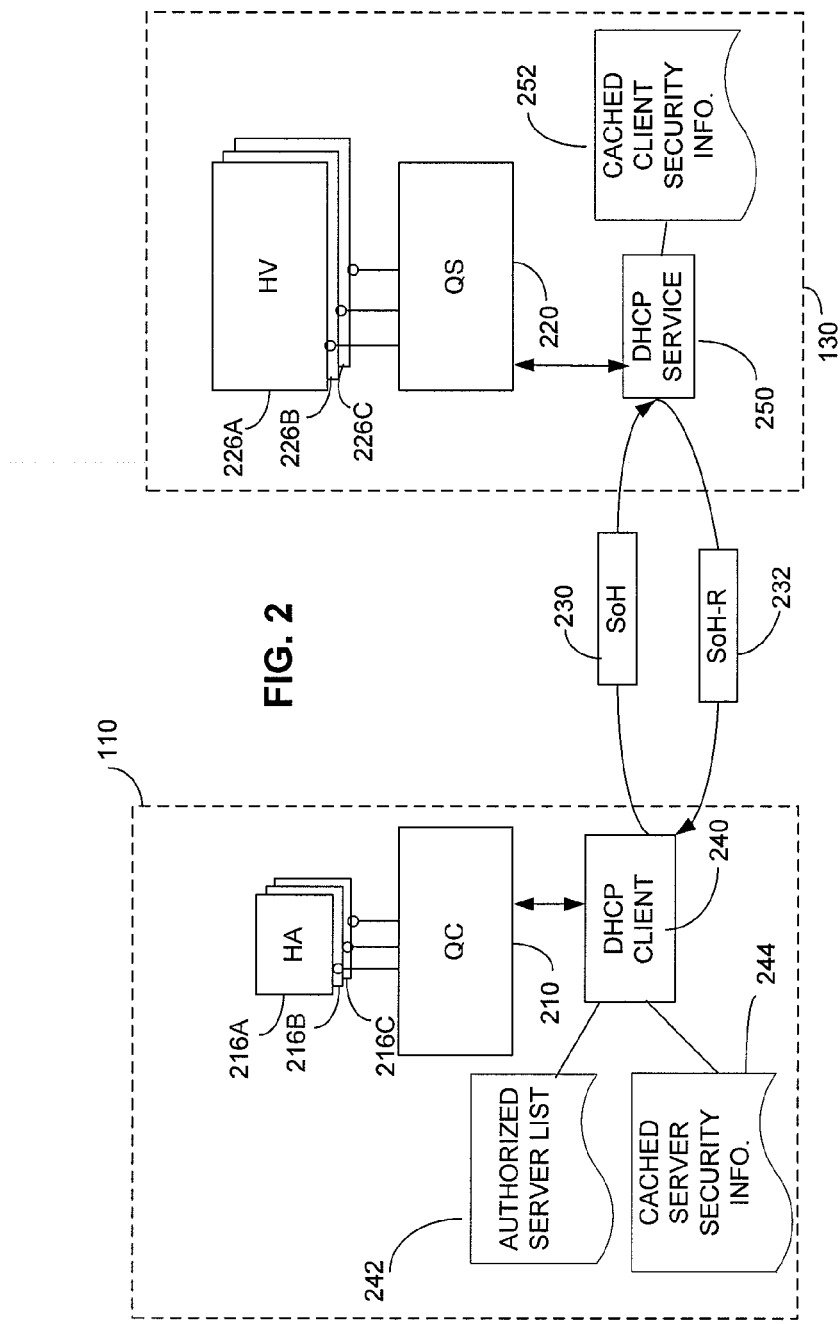
FIG. 2 is a software block diagram of a network client and an access control server according to an embodiment of the invention.

FIG. 2 shows a software architecture of a client 110 and DHCP server 130 according to an embodiment of the invention. The architecture illustrated is one example of a suitable architecture, but any other suitable architecture may be used. The software components may be implemented as computer-executable instructions encoded and organized in accordance with any suitable programming language or languages.

In the embodiment illustrated, only clients having sufficient "health" are provided network credentials. In the architecture of FIG. 2, client 110 is equipped with a quarantine client component 210. Quarantine client component 210 is a software component configured to operate when client computer 110 attempts to gain access to a secure network, such as protected network 150 (FIG. 1). In the embodiment illustrated, quarantine client component 210 performs functions associated with gathering and providing health information to a credential server.

In the embodiment illustrated in FIG. 2, quarantine client component 210 obtains information about the health of client computer 110 from one or more health agents, of which health agents 216A, 216B and 216C are illustrated. Each health agent is a software component adapted to obtain health information about a protective component of client computer 110. The health agents may be provided by vendors that provide protective components for client computer 110. For example, a vendor of antivirus software may provide a health agent that provides information about the configuration of the antivirus software installed on client computer 110. That information may identify both the version of antivirus software and the date of the most recent update of the anti-virus signature data files used by that software. Other health agents may provide configuration information about anti-spyware software, software firewall or other protective components.

In the embodiment illustrated, each health agent 216A, 216B and 216C has a standardized interface allowing quarantine client component 210 to query all health agents to obtain health information. The health agents 216A, 216B and 216C and quarantine client component 210 may be components as exist in the Microsoft Network Access Protection™ product. However, any suitable mechanism for obtaining health information may be employed.

Figure 3:
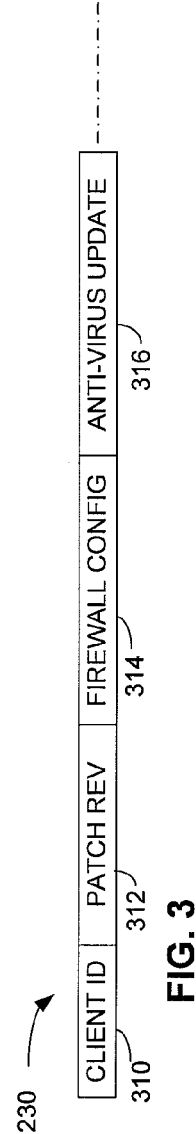
FIG. 3 is a sketch of a statement of health that may be communicated by a network client according to an embodiment of the invention.

Quarantine client component 210 may format the health information into a statement of health 230 that is transmitted to DHCP server 130. The specific format in which health information in statement of health 230 is stored or transmitted is not critical to the invention. However, FIG. 3 provides an example of information that may be contained in statement of health 230. In the example illustrated, the information may be stored in one or more tangible computer-readable media or may be transmitted as part of a message over a computer network.

In the example of FIG. 3, statement of health 230 includes a field 310 identifying client computer 110. Any suitable mechanism may be used to identify client computer, including a MAC address, a computer name, IP address or other suitable identifier. In addition, statement of health 230 may contain one or more fields containing health information about one or more types of protective software or other components. In the example of FIG. 3, three fields 312, 314 and 316 are shown. However, any suitable number of fields may be used. In this example, field 312 contains information identifying the revision level of the most recent operating-system or security patches applied to the operating system of client computer 110. Such information may be generated by a health agent associated with the operating system of the computer.

Field 314 may contain health information identifying a configuration of a host firewall computer 110. Such information may be generated by a health agent associated with the firewall. Similarly, field 316 may contain information identifying the most recent update to the antivirus signature data files in use by antivirus software within client computer 110. The information in field 316 may likewise be generated by a health agent associated with the antivirus software in use on client computer 110. If other protective software or components are in use within computer 110, statement of health 230 may contain other fields conveying information about that protective software or those components.

The statement of health 230 may be communicated to DHCP server 130, allowing DHCP server 130 to assess whether client 110 is configured in compliance with a network access policy. DHCP server 130 also may be configured with components of the Microsoft Network Access Protection™ product that make such an assessment. However, any suitable mechanism may be employed to determine whether client 110 complies with a network access policy. In the example illustrated, DHCP server 130 includes a quarantine server component 220 that processes statement of health 230 received from client 110.

In the embodiment illustrated, quarantine server component 220 accesses one or more health verifiers, of which health verifier 226A, 226B and 226C are shown. In the embodiment illustrated, each of the health verifiers 226A, 226B and 226C processes a specific type of health information that may be included in statement of health 230. As a specific example, each health verifier may process information generated by a health agent, such as health agents 216A, 216B and 216C. Separate health verifiers 226A, 226B and 226C may be provided to verify information about antivirus software, a firewall configuration or other protective components. As with health agents 216A, 216B and 216C, health verifiers may be provided by vendors of protective software or hardware for a client computer 110 and accessed through a standardized interface. However, health agents and health verifiers may be obtained from any suitable source. In the embodiment illustrated, three health agents 216A, 216B and 216C and three health verifiers 226A, 226B and 226C are shown. The number and types of health agents and health verifiers is not a limitation on the invention. Further, it is not necessary that DHCP server 130 contain the same number of health verifiers as a client computer 110 contains health agents. In some embodiments, a client computer will contain only a subset of the total available protective software and other components. Accordingly, a client computer may contain only a subset of the total available health agents. In contrast, DHCP Server 130 may contain health verifiers to process information from any of a number of client computers which may be configured with any of a number of different types of protective software or other components, and DHCP server 130 may contain more health verifiers than there are health agents in a client 110.

Regardless of the specific mechanism used to analyze health information, quarantine server component 220 determines a health status of client 110 by processing information in statement of health 230. The health status indicates conclusions about the health of client computer 110 drawn from information in statement of health 230. The conclusions about the health of client computer 110 may be presented in any suitable form.

In the embodiment illustrated in FIG. 2, statement of health 230 is communicated from DHCP client component 240 to DHCP service component 250. DHCP client component 240 and DHCP service component 250 are components that support address provisioning according to DHCP. Those components may be implemented using known techniques for implementing components to support DHCP address provisioning. However, DHCP client component 240 and DHCP service component 250 may be adapted to incorporate security information into an exchange of messages in accordance with an embodiment of the invention. For example, when statement of health 230 is communicated from DHCP client component 240 to DHCP service component 250, Statement of Health (SoH) 230 may be encrypted to prevent an unauthorized third party from obtaining information in statement of health 230 that can reveal vulnerabilities of client 110. The DHCP service component 250 may, in return, digitally sign its SoH-Response (SoH-R) 232 in order to demonstrate to the DHCP client component 240 that the response originated on an authorized DHCP server. Additionally, DHCP client component 240 and DHCP service component 250 may be adapted to insert other types of security information into DHCP messages. Conversely, DHCP client component 240 and DHCP service component 250 may be adapted to extract and use security information that is included in DHCP messages.

Additionally, DHCP client component 240 and DHCP service component 250 may be adapted to access or store information not used as part of a standard DHCP implementation. In the embodiment illustrated, client 110 is configured with a list 242 of authorized servers. Authorized server list 242 may identify credential servers authorized to provide valid credentials to client 110. In the example of FIG. 1, DHCP server 130 may be on authorized server list 242. However, rogue device 160, because it is not an authorized credential server, does not appear on authorized server list 242.

Information identifying an authorized credential server may appear on authorized server list 242 in any suitable format. In the embodiment illustrated, each server on authorized server list 242 is described by a certificate in accordance with X.509. Such a certificate allows DHCP client component 240 to identify authorized credential servers. Additionally, a certificate may allow the DHCP client component 240 to validate that a communication received by DHCP client component 240 was generated by the authorized credential server on list 242. However, certificates in other forms may be used to identify authorized credential servers. Moreover, tokens or other forms of security information alternatively or additionally may be used to represent authorized credential servers. Though, it is not essential to the invention that authorized credential servers be associated with a certificate, token or other security information and any suitable representation of authorized credential servers may be used to form list 242.

List 242 may be created and stored on computer-readable media associated with client 110 in any suitable manner. For example, a network administrator may load list 242 directly in to computer readable media in a client device 110. However, list 242 may be stored in any suitable computer readable media, including media not within the client device, and made accessible to DHCP client component 240 in any suitable way.

In addition, client 110 is shown to contain a cache 242 of server security information. In the embodiment illustrated, server security information in cache 244 is obtained through an exchange of DHCP messages between client 110 and DHCP server 130. However, the security information stored in cache 244 may be obtained in any suitable way. In the embodiment illustrated, list 242 and cache 244 are shown as separate components. This representation illustrates that information used by DHCP client component 240 may be stored in different locations or may be obtained from different sources. However, it is not critical to the invention that information in list 242 and cache 244 be stored separately. Information may be combined for storage. Alternatively, in some embodiments, either or both of list 242 and cache 244 may be omitted.

As shown in FIG. 2, DHCP server 130 may likewise store security information. In the embodiment illustrated, cache 252 stores client security information. The information in cache 252 may be obtained by DHCP service component 250 during interactions with network clients seeking access to a network, such as security network 150 (FIG. 1). In the embodiment illustrated, a single client 110 is shown. However, a network may have numerous clients and cache 252 may store information relating to multiple clients. Accordingly, the amount or type of information stored in cache 252 is not a limitation on the invention. Likewise, the representation of the information in cache 252 is not a limitation, and any suitable representation may be used.

Figure 4A:
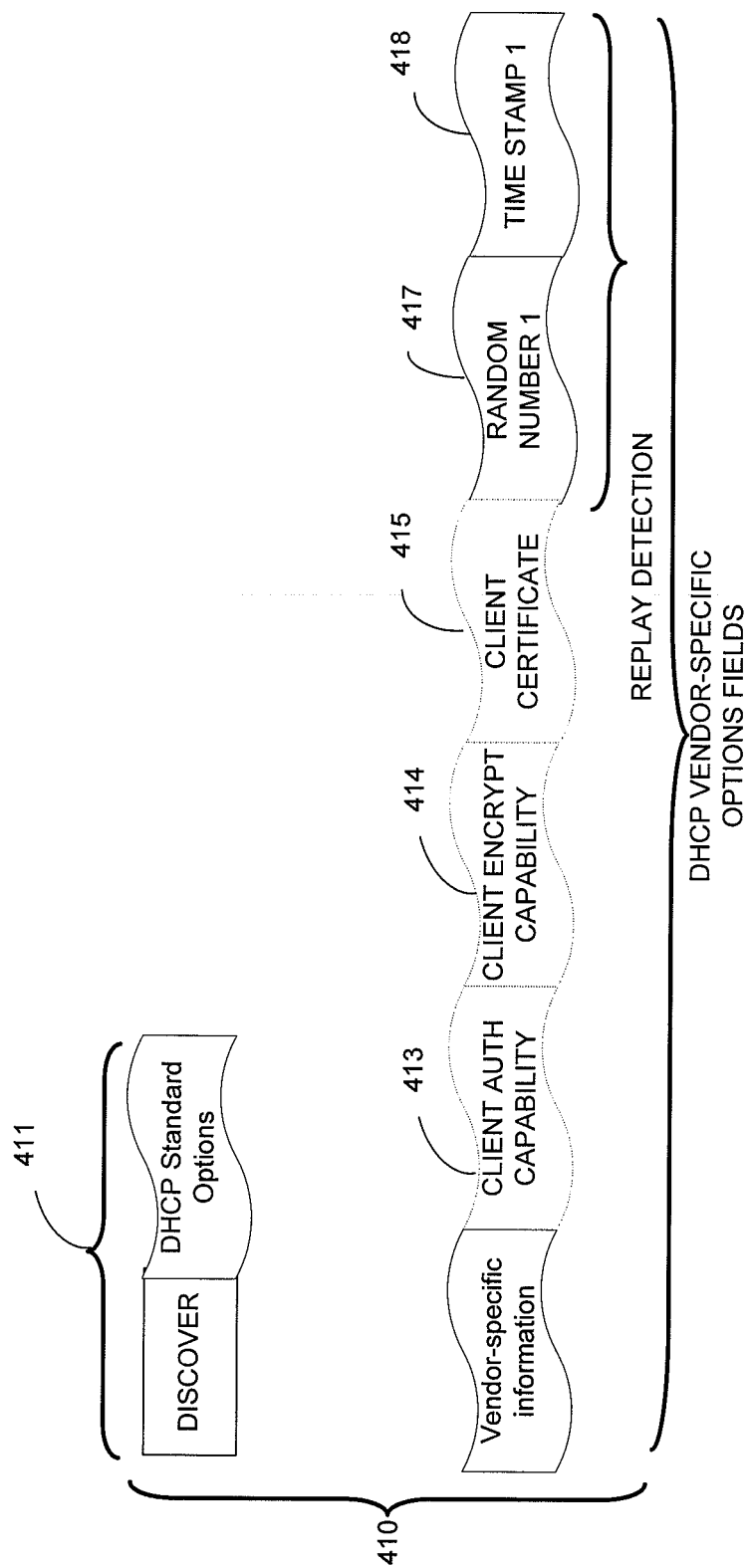
FIG. 4A is a sketch of a DHCP discover message including options fields according to an embodiment of the invention.

Turning to FIGS. 4A, 4B, 4C and 4D, examples of messages that may be exchanged between DHCP client component 240 and DHCP service component 250 are provided. These messages may support secure address provisioning according to an embodiment of the invention. FIG. 4A illustrates a discover message 410. Discover message 410 may be generated by DHCP client component 240 and may contain a first portion, represented by portion 411, including one or more fields containing information sent in a discover message according to DHCP or other suitable protocol. Additionally, discover message 410 includes DHCP vendor-specific options fields.

The vendor-specific options fields may be formatted according to DHCP, even though the contents of those fields is not specified by that protocol. FIG. 4A illustrates options fields 413, 414, 415, 417 and 418. In the embodiment illustrated, options fields 413, 414, 415, 417 and 418 may represent fields in a discover message according to DHCP for which the protocol does not specify content. In this example, the options fields used to convey security information relevant to this invention are shown to be embedded in the vendor-specific information option permitted by the DHCP protocol. However, the specific format in which that security information is conveyed is not a limitation on the invention and any suitable format such as DHCP standard options may also be used for this exchange.

In the embodiment illustrated, the discover message 410 includes a client authentication capability option field 413 that indicates the type of security authentication that the client desires to engage with the server. This information can also be used to indicate the capability or the intent of the client in the case where various types of client computers with different capabilities are present on the network. For instance, computers with different operating system versions may support different types of security and authentication modes. Specifically, in this embodiment the client indicates to the server using option field 413 whether it can support mutual-authentication between the client and the server or whether it wants to support only server-authentication (i.e., the client authenticates the server, but the server does not authenticate the client).

The discover message also includes a client encryption capability option field 414 which indicates the modes of encryption that the client supports that can be used for this exchange in the subsequent offer message 420, request message 430 or ack message 440. The encryption mode that the client may support may be based on a client certificate 415 which optionally may be included in the discover message 410. Alternatively, the client may support encryption based on a shared key that can be generated by the client and sent to the server in the request message 430. The encryption capability option field 414 may also include the different encryption algorithms that the client supports.

As illustrated, discover message 410 optionally may include a client certificate in options field 415. In the example illustrated, the client certificate may be a certificate in accordance with X.509 issued to client 110. However, the format of the security information about client 110 conveyed in discover message 410 is not a limitation on the invention. For example, in some embodiments, options field 415 may contain a token, a public key, a certificate URL (which points to the location of the client certificate) or other security information associated with client 110. In yet a further embodiment, discover message 410 may include no security information associated with client 110.

Additionally, discover message 410 includes information that uniquely identifies an instance of message 410. Such information is used to detect replay-type attacks. In the embodiment illustrated, this information is in the form of a random number stored in options field 417 and a time stamp stored in options field 418. The random number stored in options field 417 may be any number generated by client 110 when it forms discover message 410. The time stamp in options field 418 may be a value representing the time at which client 110 formed discover message 410.

The random number and time stamp in options fields 417 and 418, respectively, collectively form a nonce. Because of the inherent randomness and uniqueness of the information used to form the nonce, the likelihood that any two discover message will contain the same nonce will be virtually zero. Consequently, the nonce acts as a unique identifier for the discover message 410. However, any suitable globally or locally unique identifier may be used.

Figure 4B:
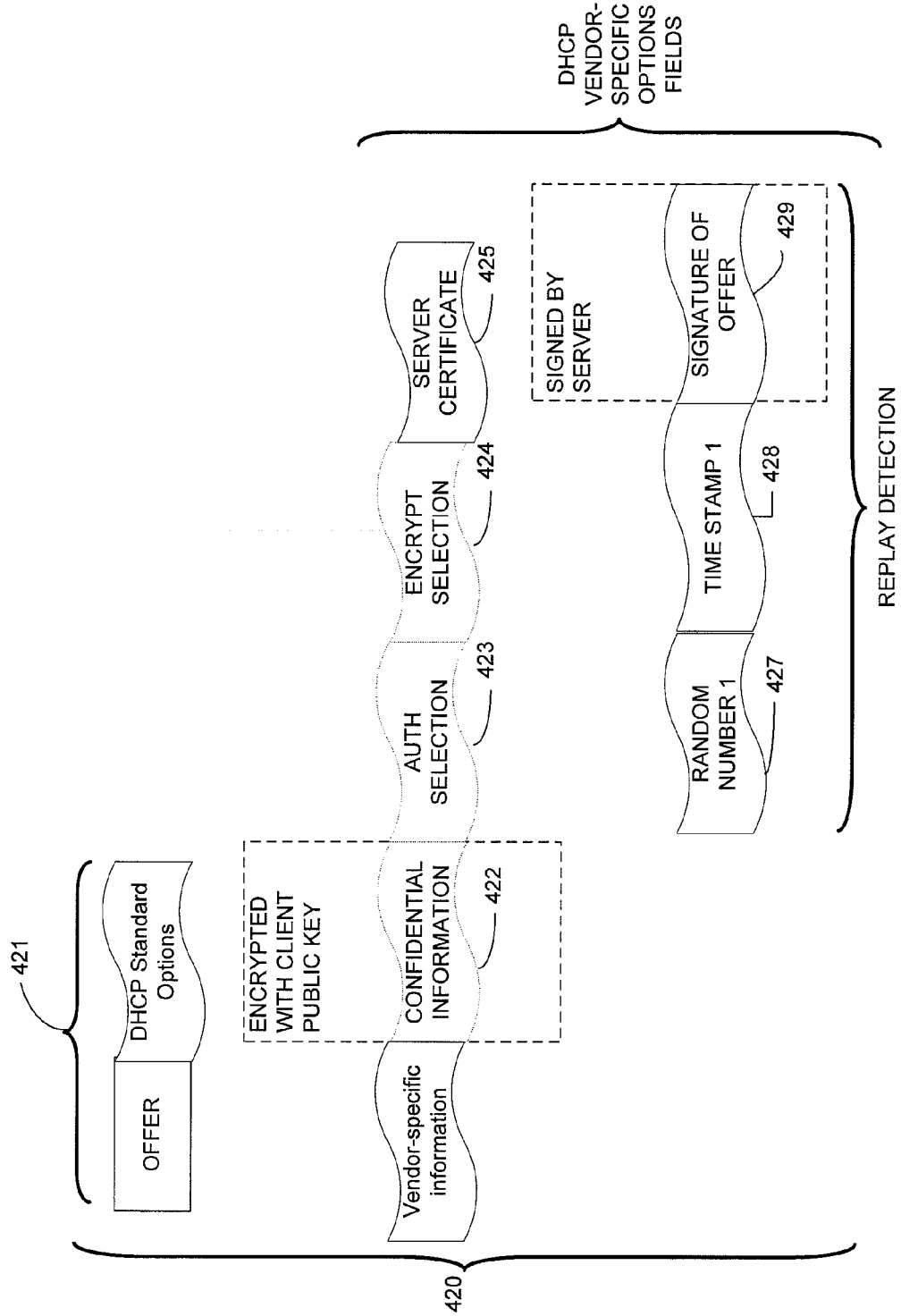
FIG. 4B is a sketch of a DHCP offer message with options fields according to an embodiment of the invention.

FIG. 4B illustrates an offer message 420 that may be generated by DHCP server 130 as part of an exchange of messages for provisioning client 110 with a network address or other credential information. Offer message 420 includes a first portion 421 that may contain fields or other content used in an offer message according to a standard DHCP implementation. Offer message 420 additionally contains a second portion containing vendor-specific options fields 422, 423, 424, 425, 427, 428 and 429. That second portion may include security information.

In the embodiment illustrated, offer message 420 is generated by a DHCP server in response to a discover message 410. It should be appreciated that the client and the server may support different authentication capabilities. The DHCP server selects an authentication mode that it supports from those included by the client in option 413 in the discover message 410. It includes a server authentication selection option 423 which includes the specific authentication type it wants to use, thereby allowing devices with differing capabilities to communicate with each other. The DHCP server also includes its certificate in option field 425. In the example illustrated, the server certificate may be a certificate in accordance with X.509 issued to server 130. However, the format of the security information about server 130 conveyed in discover message 410 is not a limitation on the invention. For example, in some embodiments, options field 425 may contain a token, a public key or other security information associated with server 130.

The security information in offer message 420 may include the nonce from discover message 410 processed in a format that allows a client receiving offer message 420 to authenticate the DHCP server that generated offer message 420. In the embodiment illustrated, that authentication is provided by the contents of options fields 422, 423, 424, 425, 427, 428 and 429. Fields 427 and 428 contain a copy of the nonce from the discover message 410 processed by the DHCP server in a fashion that allows a client receiving offer message 420 to validate that the processing was performed by an authorized server. Field 429 contains a hash of the OFFER message 420 (or an invariant part thereof including fields 423, 424, 427 and 428) processed by the DHCP server in a fashion that allows the receiving client to validate that the offer message was sent by an authorized server. As a specific example, that processing involved in the generation of field 429 may include generating a signature from a portion of the offer message including the nonce using a private key associated with the server. Because portions of the offer message are modified by network elements en route as per the protocol design, such portions of the message should not be included in the computation of the signature. Examples of such portions include header fields and relay or forwarding options that the protocol requires for routing of messages. That signature may then be included within options fields of offer message 420. The signature proves to the client that the message has been generated by an authorized server and that the relevant portions of the offer message are not being tampered and replayed by an unauthorized entity enroute.

Additionally, offer message 420 may include a server encryption selection option 424. As noted earlier in the case of the authentication capability, the client and the server may also support different encryption capabilities. The DHCP server selects an encryption mode that it supports from those included by the client in option 414 in the discover message 410. It includes a server encryption selection option 424 which includes the specific encryption mode and algorithms that it can use, thereby allowing the devices to communicate with each other. For example, the information may indicate that the server can obtain a client public key based on a certificate or a certificate URL included in options field 415 (FIG. 4A). Alternatively, the information in options field 424 may indicate that the server can support a key exchange algorithm which would allow the server to obtain a shared key from the client. In addition, the information in option field 425 may include a selection from the different encryption algorithms that the client indicated it supports in option field 414 in discover message 410.

In the embodiment illustrated, the options field 422 may be encrypted with a client public key if a client security token such as client certificate 415 was included in the discover message 410 and depending on the negotiated capability of the client and the server as denoted by fields 414 and 424. The client public key used to encrypt the options fields in offer message 420 may be derived by the DHCP server from the information contained in options field 415 (FIG. 4A). For example, in the embodiment in which options field 415 contains a client certificate, the server may extract the client's public key from the certificate or use the certificate's URL to obtain the client certificate's public key from a key server. However, the specific mechanism by which the server obtains a client shared key from information in options field 414 is not critical to the invention and any suitable mechanism may be used. It should be noted that the server should include any confidential information 422 in the calculation of the signature 429 before such information has been encrypted. This will allow the client to validate that information 422 has not been tampered en route.

It should be appreciated that the format of offer message 420 may depend on the capabilities of DHCP server 130. For example, if the server does not support authentication of the client's certificate, options field 422 may be transmitted in an unencrypted fashion and options field 424 may indicate that a shared key should be used for subsequent authentication and/or encryption.

Figure 4C:
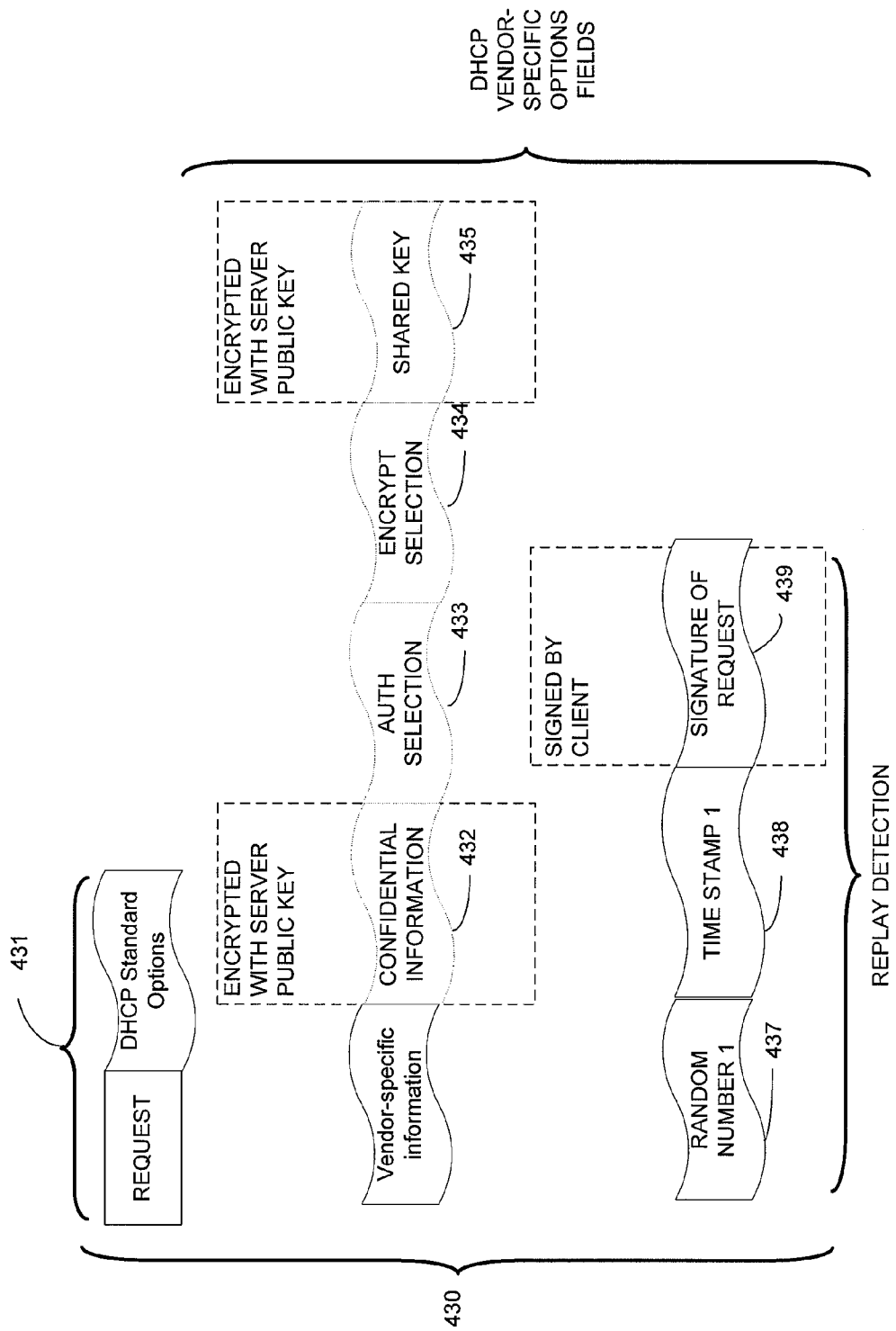
FIG. 4C is a sketch of a DHCP request message with options fields according to an embodiment of the invention.

Turning to FIG. 4C a request message 430 is illustrated according to an embodiment of the invention. As shown, request message 430 contains a first portion 431 containing information of the type that may be contained in a standard DHCP request message and a second portion containing vendor-specific options fields, which includes the security information, here illustrated as options fields 432, 433, 434, 435, 437, 438 and 439. In the embodiment illustrated, the second portion includes a nonce, here implemented as a random number in options field 437 and a time stamp in options field 438. The nonce used in request message 430 is here shown to be the same as that used in discover message 410.

In this embodiment, the client includes an acknowledgment of the server's authentication selection 423 and encryption selection 424 from the offer message 420 in the request message 430 through the options 433 and 434. As noted above, if in the encryption mode negotiated the use of a shared key, then the client generates a shared key, encrypts it with the server's public key obtained from the certificate 425 in the offer message 420 and includes that as option 435.

As noted earlier, the process of provisioning a client with a network address may include providing a statement of health 230 communicating configuration information about the client. In the embodiment illustrated, the client 110 can also encrypt confidential information 432 such as its statement of health using the server's public key and include that in the request message 430.

Request message 430 may also allow a client 110 to sign the message in order to prove its authenticity using the client's certificate if a client certificate 415 was included in discover 410 or the shared key generated earlier. In this case, the client should sign selected invariant portions of the request message since certain DHCP message fields may be modified by network elements en route. The client may include the confidential information in 432 (before it is encrypted), security information such as 433, 434, 435, and the replay detection token consisting of 437 and 438 in the computation of the signature 439.

Figure 4D:
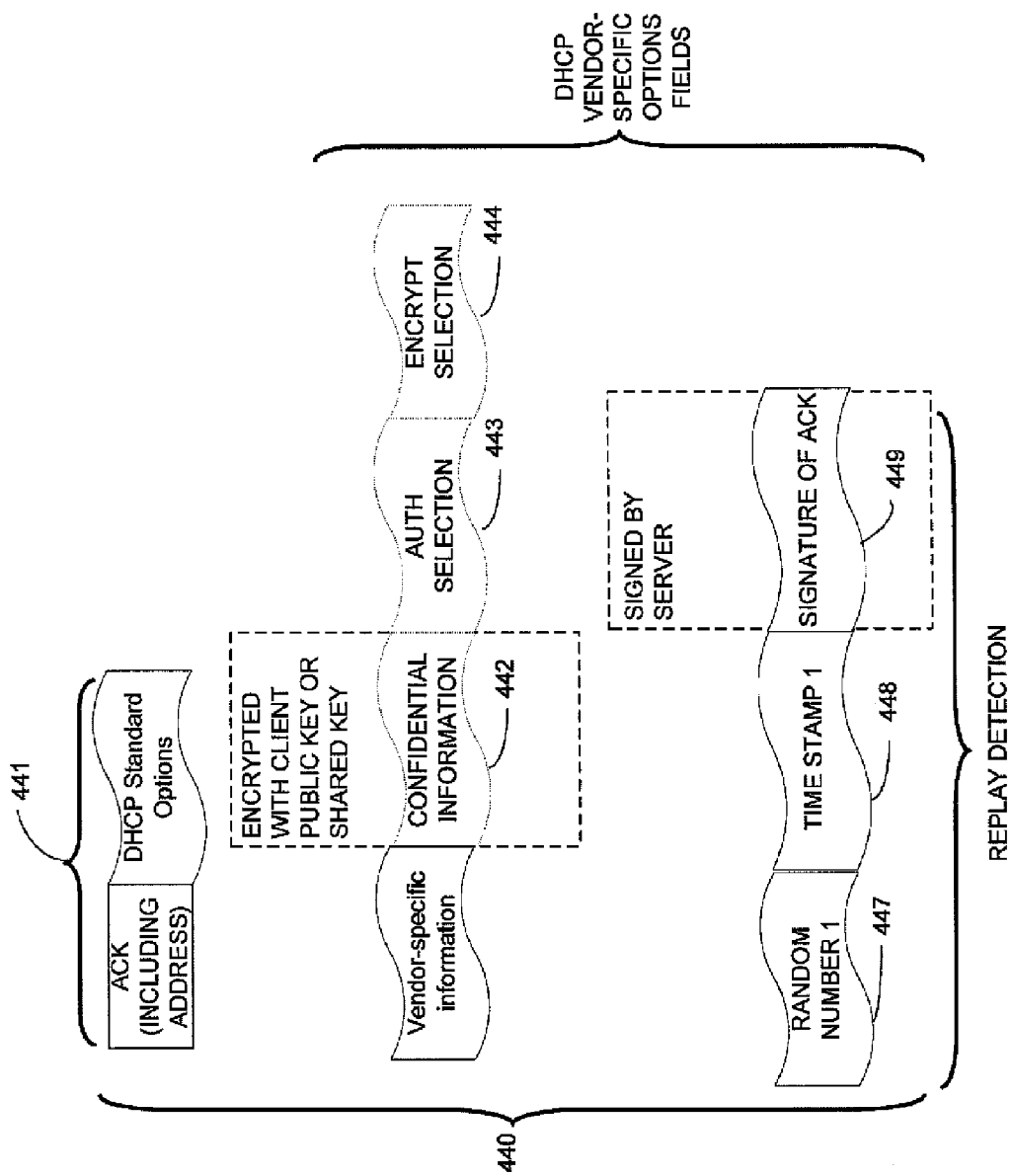
FIG. 4D is a sketch of a DHCP ACK message with options fields according to an embodiment of the invention.

Turning to FIG. 4D, an ACK message 440 is illustrated. In the embodiment illustrated, ACK message 440 includes a first portion 441 containing such information as may be included in an ACK message according to DHCP. For example, this first portion may contain the address and other standard options assigned by the DHCP server 130 to client 110. ACK message 440 also contains a second portion, which contains vendor-specific options whose format is defined by DHCP, but not the content. In the embodiment illustrated, this second portion may contain security information in options fields 443, 444, 447, 448 and 449.

In the embodiment illustrated, the second portion includes in options fields 447 and 448 the nonce from discover message 410 (FIG. 4A). Option fields 443 and 444 repeat the authentication and encryption selections that were negotiated between the client and the server in the discover message 410, offer message 420 and request message 430. In this embodiment, the server includes a signature of the invariant portion of the ACK message 440 that should not be modified by network elements en route to the client, using the server's certificate 425 included in the offer message 420. The server may include such information as the address assigned to the client, any confidential information it intends to send and the security information in options 443, 444, 447 and 448 in the computation of the signature 449. Such a signature allows the client to authenticate that the address in first portion 442 was generated by an authorized server.

As noted earlier, the process of provisioning a client with a network address in the ACK message 440 may include a SoH-R 232 as a response from the server to the client's statement of health 230 included in the request message 430. In the embodiment illustrated, the client 110 can encrypt confidential information (as it deems necessary) as option field 432 using the client's public key from the certificate 415 in discover message 410 or the shared key 435 sent by the client in the request message 430.

It also proves to the client that the messages have not been tampered en route, by providing proof that it was able to decrypt the secret key generated by the client and encrypted as option 435 in request message 430. Such proof may be constituted by encrypting the secret key using the client's certificate (if one was included in the discover message) in the ack message 440, or use of the secret key in the computation of the signature 449 of the ack message 440.

It should be appreciated that the server may include the unencrypted confidential information in the computation of signature 449. The client upon receiving the ACK message can then decrypt the confidential information and verify it as a part of the signature verification, thereby inferring that the ACK message 440 and the associated confidential information was generated by DHCP server 120.

In the embodiment illustrated, the operating mode includes encryption. Accordingly, portions of the offer message 420, request message 430 and the ACK message 440 are shown to be encrypted. In embodiments in which encryption is not supported, the corresponding information may be sent in the clear or, depending on the device's discretion, a message may not be transmitted at all.

Turning to FIGS. 5A, 5B, 5C and 5D, a process is illustrated through which a client 110 and DHCP server 130 exchange messages to provide the client with a network credential such as a valid network address using security information according to an embodiment of the invention. The process begins a block 510 where the client obtains the security information for the authorized DHCP servers on a network. For instance, such information may consist of the trust anchor which may issue X.509 certificates to the servers authorized to provide a network credential. Alternatively, this information may include a list of server IP addresses and the associated security tokens, such as an encryption key or a token. The list obtained at block 510 may be embodied as the authorized server list 242 and/or the cached server security information 244 (FIG. 2).

Regardless of how the list of authorized servers is obtained, the process proceeds to block 511. At block 511, the client 110 receives an event of the type that triggers a DHCP transaction on the client as is customary, such as a physical network media connection event.

At the initialization of the DHCP message exchange shown in block 512, the client generates a replay detection nonce. The replay detection nonce may include a random number and a time stamp as illustrated in FIG. 4A. However, the nonce may be in any suitable form. Next at block 513, the client compiles the information about the authentication and encryption methods it supports.

At block 514, client 110 sends a discover message. The discover message may be in the form of discover message 410 (FIG. 4A), including the information generated in blocks 512 and 514. If a discover message in the form of discover message 410 (FIG. 4A) is sent and if the client is configured to do so, it may include security information such as the client's X.509 certificate as indicated in options field 414 (FIG. 4A). However, any suitable form of token or other security information may also be used.

Regardless of the specific form of the discover message sent at block 514, the process continues at block 520 with process steps performed on DHCP server 130. At block 520, the DHCP server receives the discover message sent at block 514. At block 521, the server validates the client security information included in the discover message if such information was included in the discover message. In an embodiment in which the token is a certificate issued by a trusted source, DHCP server 130 may validate the client token based on information from that trusted source. However, any suitable mechanism may be used for validating the client security information at block 521.

At decision block 524, the process branches depending on whether the client token was determined to be valid at block 526. If the token is not valid, the process branches to exception handler 526. Any suitable processing may be performed by exception handler 526. For example, DHCP server may simply ignore the security information included in the discover message and skip the processing shown at blocks 528, 529 and 530, proceeding to process the remainder of the DHCP message at block 527 and sending an offer message to the client 532. Alternatively, the server may simply drop the received discover message and do no further processing on it. The processing at exception handler 526 may also include any actions appropriate upon receipt of a discover message from a client that could not be validated, such as notification to the administrator.

Figure 5A:
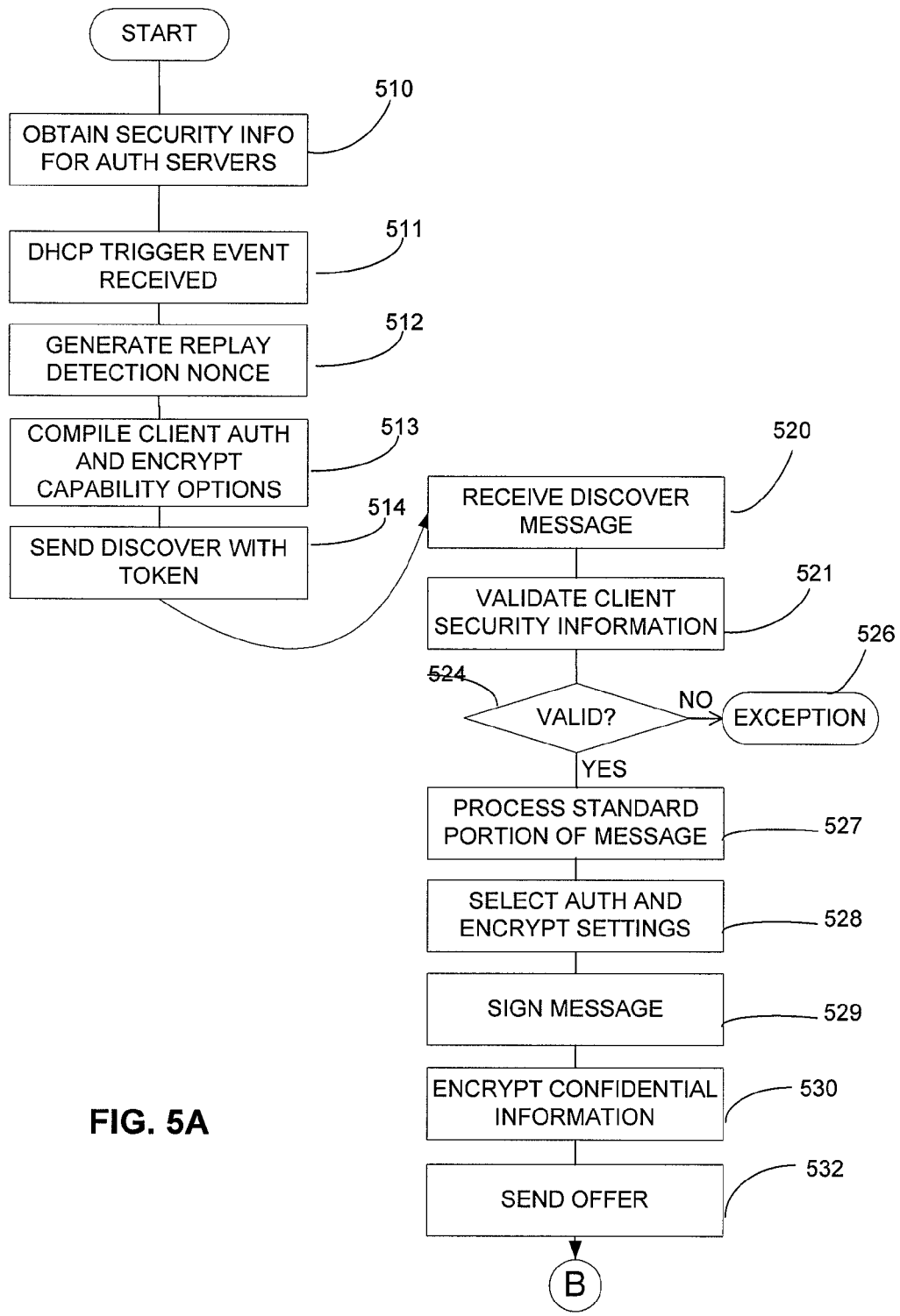
FIGS. 5A-5D, when connected at the points labeled B, C and D, form a flow chart of a method of secure network address provisioning according to an embodiment of the invention.
Figure 5B:
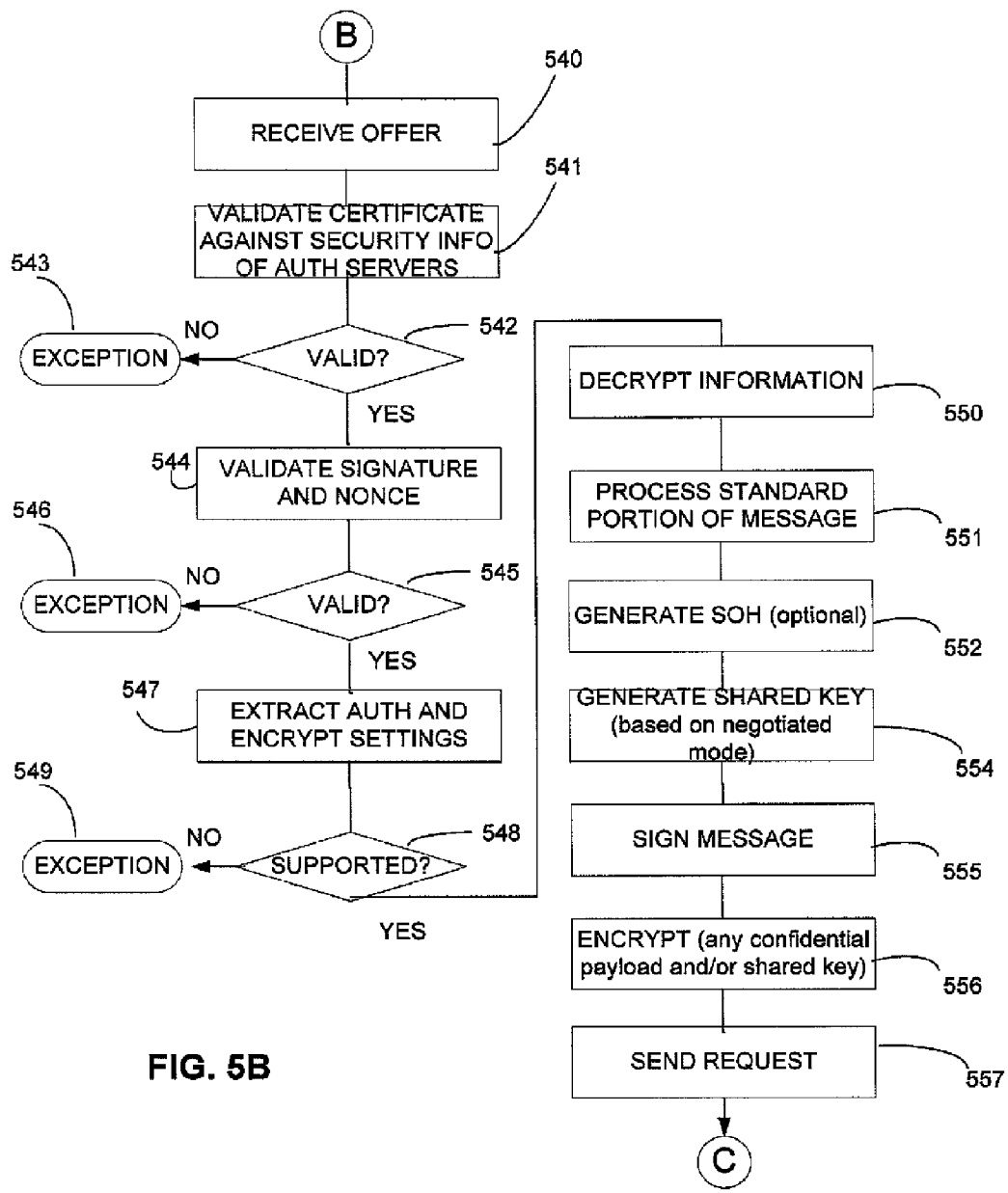

Conversely, when the token received in the discover message is valid, processing proceeds to block 527, where the standard portion of the DHCP discover message is processed as is the norm. At block 528, DHCP server 130 selects the authentication and encryption settings it wants to use from among those sent by the client. At block 529, the server signs the nonce sent by the client in the discover message with its own key. If the client requested encryption and sent the client security information in the discover message, and if the server was able to successfully select a common encryption setting from amongst those sent by the client, then at block 530, the DHCP server encrypts any confidential information it wants to protect with the client's public key. The outputs of blocks 527, 528, 529 and 530 may be then formed into an offer message such as in 420 (FIG. 4B). At block 532, DHCP server 130 may then send the offer message to client 110. As illustrated in FIG. 5B, the process continues at block 540 with processing performed on client 110. At block 540, client 110 receives the offer message sent at block 532.

At block 541, client 110 validates the server security information 425 extracted from the offer message 420 sent by the DHCP server 130 against the cached security information it received at block 510 for the authorized servers it wants to communicate with. In the embodiment in which this security information consists of a X.509 certificate, the client validation may consist of validating the certificate against the trust anchor for the authorized servers.

Processing then continues at decision block 542, where the process branches depending on whether the security information from the server was determined to be valid at block 541. If the information is not valid, the process branches to exception handler 543. Any suitable processing may be performed by exception handler 543. For example, the client may simply abandon the attempt to secure the message exchange mechanism, ignore the security portions 422, 423, 424, 425, 427, 428 and 429 of the offer message 420 and skip to processing the remainder of the DHCP message at block 551 and send a request message to the server at block 557. Alternatively, the client may simply drop the received offer message and do no further processing on it. The processing at exception handler 543 may also include any actions appropriate upon receipt of an offer message from a server that could not be validated, such as notification to the administrator.

Conversely, when the security information received in the offer message is valid, processing proceeds to block 544, where the client validates the signature 429 on the offer message 420 using the security information 425 that has been validated at block 541. The client also validates that the replay detection token 427 and 428 in the offer message 420 matches that the replay detection token 417 and 418 in the discover message 410. This validation allows the client to determine if the offer message has been tampered en route or if it is subject to a replay attack.

Again, the processing proceeds to decision block 545, where the process branches depending on the result of the validation in block 544. If the information is not valid, the process branches to exception handler 546, where any suitable processing may be performed. For example, the client may simply drop the received offer message and do no further processing on it. The processing at exception handler 546 may also include any actions appropriate upon receipt of an offer message from a server that indicates that it has been tampered or is subject to replay attacks, such as notification to the administrator.

Conversely, when the signature on the message and the replay detection token has been successfully validated, processing proceeds to block 547, where the client extracts the authorization selection settings 423 and the encryption selection settings 424 from the discover message 420. Here, the client validates that these settings are supported by the client and were among those sent in fields 413 and 414 in the discover message 410. At decision block 548, the processing may again branch depending on the settings used. If the settings are not supported, processing branches to exception handler 549. Again, the exception handler may drop the received offer message, or abandon the attempt to secure the message exchange by skipping to processing the remainder of the DHCP message at block 551 and sending a request message to the server at block 557.

If the settings are supported and if the server had encrypted information 422 in the offer message 422 using the client's security information 415, then at processing block 550, client 110 uses the selected encryption settings 424 to decrypt the encrypted portion of the offer message using its security information. In the embodiment in which the shared key is the client's certificate, client 110 decrypts the message using that certificate. However, the specific processing performed at block 542 may depend on the nature of the key or other secret information shared between client 110 and DHCP server 130 and the manner in which that shared secret is used to encrypt information in the offer message.

Regardless of how the information is decrypted, once the information is decrypted, processing proceeds to block 551. At block 551, client 110 processes the standard portion of the DHCP offer message 420 as is the norm.

At block 552 in the illustrated embodiment, client 110 generates a statement of health or other status information that may be used to demonstrate that client 110 complies with a network access policy. The statement of health may be generated by quarantine client component 210 (FIG. 2). However, any suitable mechanism may be used to generate the statement of health at block 550. The processing at block 552 is an example of the confidential information that may be encrypted using this invention. The specific content of the confidential information that is protected using this message exchange is not a limitation of this invention.

The process then proceeds to block 554. At block 554, client 110 may optionally generate a shared key for use in securing message transmissions from the server to the client depending on the authentication settings 423 and encryption settings 424 if the client had not included its security information 415 in the discover message 410. Any suitable mechanism may be used to generate a shared key at block 554.

At block 555, client 110 may include a nonce and include a signature 439 in the request message 430. In the illustrated embodiment, the request message may be created through the outputs of processing blocks 551, 552 and 553.

At block 556, information to be included in a request message for which encryption is desired (such as the confidential information generated in block 552 and the shared key generated in block 554) may be encrypted in a manner that DHCP server 130 can decrypt. In the embodiment illustrated, client 110 obtains a public key for DHCP server 130. Client 110 can use the server public key to encrypt the information to be transmitted in the request message. In an embodiment as illustrated in FIG. 4C in which the request message also identifies client capabilities for using security information as part of address provisioning, the information encrypted at block 556 may include information about those client capabilities, such as is illustrated by the content of options field 432 and 435 (FIG. 4C).

The process then proceeds to block 557 where client 110 sends the request as formatted.

Figure 5C:
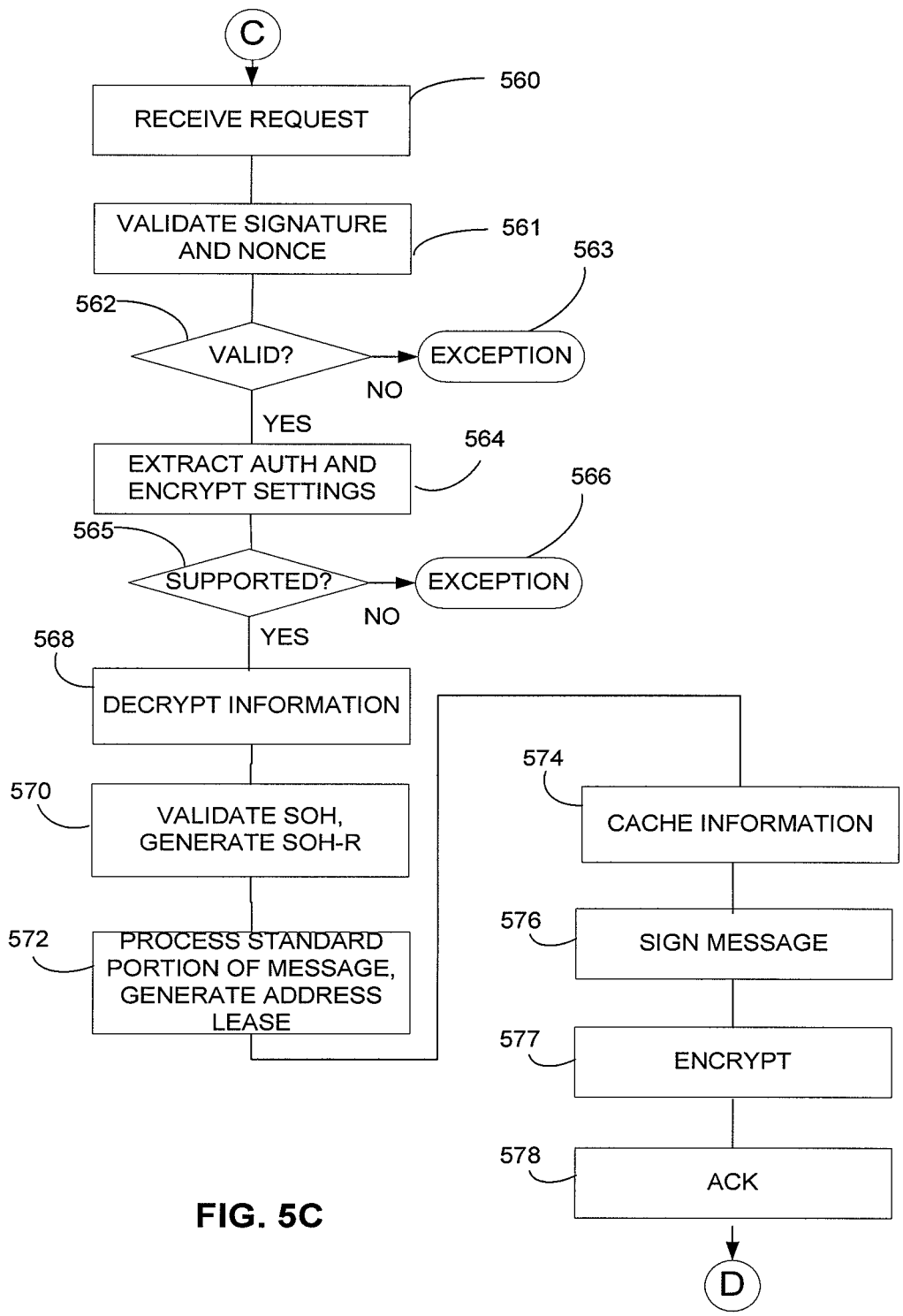

FIG. 5C shows the process continuing with acts performed by DHCP server 130. That process begins at block 560 where DHCP server 130 receives the request message. At block 561, DHCP server 130 may optionally validate any signature 439 on the request message 430 depending on the authentication parameter 433 using the security information 415 that the client may have received in the discover message 410. The server may also validate that the replay detection token 437 and 438 in the request message 430 matches that the replay detection token 417 and 418 in the discover message 410. Such validation, if done, allows the server to determine if the request message has been tampered en route or if it is subject to a replay attack.

Further processing may branch at decision block 562 depending on the result of the validation in block 561. If the validation fails, the process branches to exception handler 563, where any suitable processing may be performed, similar to that explained for exception handler 546 above.

If the validation succeeds, the server may again extract and validate the authentication settings 433 and encryption settings 434 in processing block 564, to ensure that these are supported by the server and correspond to those that the server included in the offer message 420. At decision block 565, the processing may again branch depending on this check. If the settings are not the same, processing branches to exception handler 566, which may drop the received request message or abandon the attempt to secure the message exchange by skipping to processing the remainder of the DHCP message at block 572 and sending an ack message to the client at block 578.

If the settings are supported, processing continues at block 568 where the server decrypts the portions of the request message encrypted by the client at block 556. In the embodiment in which information is encrypted at block 554 with the server public key, decryption at block 568 may be performed with a server private key corresponding to the public key used at block 554. However, the specific mechanism of encrypting information is not critical to the invention, and processing at block 568 may depend on the specific form of encryption used.

In the illustrated embodiment of this invention, where the confidential information may include a client statement of health, the DHCP server 130 may at processing block 570 validate the statement of health communicated in the request message received at block 560. The validation may involve comparing the statement of health to a network access policy to determine whether client 110 is in compliance with that policy. In a DHCP server implemented as illustrated in FIG. 2, validation at block 570 may be performed by a quarantine server component 220. However, any suitable mechanism may be used to validate the statement of health. The result of the health validation is captured in the statement of health response (SoH-R), which indicates whether client 110 is in compliance with the network access policy. If the statement of health indicates that the client is not in compliance with the network access policy, the SoH-R may include remediation information generated by quarantine server component 220 upon processing the statement of health or obtained from any other source. It should be appreciated that the content of the confidential information included in this message exchange and the nature of its processing is not a limitation of this invention.

Processing continues at block 572, the server processes the remainder of the DHCP message and generates an appropriate address lease. In the illustrated embodiment, where the confidential information is the client's statement of health, the address and other parameters selected by the server may depend on the result of statement of health validation (SoH-R).

Regardless of the mechanism used to generate address information at block 568, the process may proceed to block 574. At block 574 information concerning the client to which an address has been assigned may be cached. In a DHCP server with an architecture as illustrated in FIG. 2, this information may be stored in a cache 252. However, any suitable storage mechanism may be used to store client information. The information cached at block 570 may include the client token validated at block 521 (FIG. 5A), the selected authentication and encryption settings validated at block 564 or other security information used to communicate with client 110 such as the shared key that may be generated by the client in block 554 (FIG. 5B) and included in the request message. By storing this information, DHCP server may further communicate with client 110 using authentication or encryption. For example, when an address is stored for a limited period of time, a client may contact DHCP server 130 when the address expires to renew that address. In those subsequent communications, server 130 may communicate with client 110 using cached information.

The process may then proceed to block 576. At block 576, DHCP server 130 may again include the nonce it received in the request message at block 560, in the ack message created as a result of processing in blocks 570 and 572. The DHCP server then signs the message using its security information.

Further at block 577, the server encrypts any confidential information that it wants to protect from eavesdroppers, such as the SoH-R generated in block 570, in a fashion that it can be decrypted by client 110 using the encryption settings 434 (FIG. 4C) negotiated between the client and server. In the embodiment illustrated, if the client 110 provides a security token 415 (FIG. 4A) in conjunction with a discover message 410, the client token may be used in block 577 to encrypt the confidential information. Alternatively, depending on the encryption settings, if the client included a shared key 435 (FIG. 4C) in the request message 430, then this key may be used for the encryption. However, any suitable mechanism may be used at block 572 for encryption.

The process then proceeds to block 578 where DHCP server 130 sends an ACK message to the client. The ACK message sent at block 574 may have the format of ACK message 440 illustrated in FIG. 4D. However, any suitable format may be used. The ACK message sent at block 574 may communicate to client 110 the address generated at block 572, as well as other information that the server desires to communicate to the client. For example, in embodiments in which DHCP server 130 wishes to communicate any remediation instructions resulting from the validation of its statement of health to client 110, such remediation instructions may also be encrypted and communicated to client 110 in the ACK message sent at block 578.

Figure 5D:
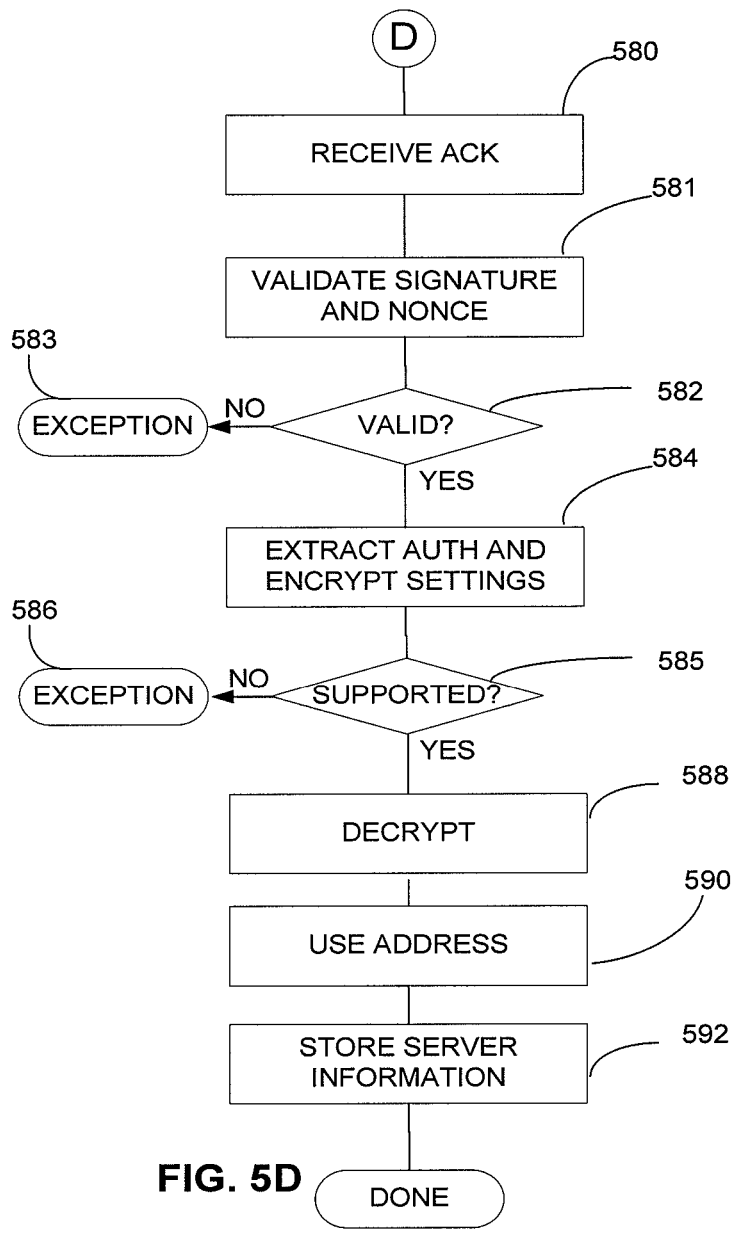

The process then continues with processing as illustrated in FIG. 5D, which may be performed in client 110. The processing shown in FIG. 5D begins at block 580. At block 580, client 110 receives the ACK message transmitted at block 578.

At block 581, the client validates the signature 449 on the ack message 440 depending on the negotiated authentication parameters 443 using the server's security information 425 received in the offer message 420. The client may also validate that the replay detection token 447 and 448 in the ack message 440 matches the replay detection token 417 and 418 in the discover message 410. This enables the client to determine if the ack message has been tampered en route or if it is subject to a replay attack.

Further processing may branch at decision block 582 depending on the result of the validation in block 581. If the validation fails, the process branches to exception handler 583, where any suitable processing may be performed, similar to that explained for exception handler 546 above.

If the validation succeeds, the server may again extract and validate the authentication settings 443 and encryption settings 444 in processing block 584, to ensure that these are supported by the client and correspond to those that the client in included in the request message 430. At decision block 585, the processing may again branch depending on this check. If the settings are not the same, processing branches to exception handler 586, which may drop the received ack message or abandon the attempt to use any confidential information sent by the server.

If the settings are supported, processing continues at block 588 where the client 110 decrypts information in the ACK message that was encrypted by the DHCP server 130, as per the negotiated encryption settings. In an embodiment in which the information is encrypted using the client's public key, the decryption at block 588 may be performed using the client's private key. In cases where information was encrypted using the shared key 435 sent by the client in the request message 430, the decryption may use a corresponding token. However, the processing at block 588 may use any suitable decryption algorithm negotiated between the client and the server. In embodiments where the described security mechanisms are used to protect the statement of health response (SoH-R) sent by the server to the client, the decrypted information is used by the client for remediation of any health issues.

At block 590, the address contained within the ACK message may be used by client 110. In the embodiment illustrated, the address may be used by client 110 in the same way that an unassigned address is used by a DHCP client as is known in the art. However, any suitable use of the assigned address may be made at block 590.

At block 592, client 110 may store server security information obtained through the exchange of provisioning messages. The stored information may include the identity of the DHCP server, key information, mode of operation or other suitable security information. This information may be used, for example, by client 110 to generate a message to renew an address lease or to otherwise communicate further with the DHCP server. In an embodiment employing the architecture of FIG. 2, this information may be stored in cache 244. However, the specific mechanism to store the information, and the specific information stored is not critical to the invention.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having,"

"containing," "involving," and variations thereof herein, is meant to encompass the items listed thereafter and equivalents thereof as well as additional items.

What is claimed is:

1. A method of operating a networked device coupled to a network comprising a credential server that provides network credentials in accordance with a protocol comprising a plurality of messages, each message comprising a plurality of fields prescribed by the protocol, with a first portion of the plurality of fields having content prescribed by the protocol and a second portion of the plurality of fields having content that is not prescribed by the protocol, the method comprising:
    sending a first message of the plurality of messages, the first message comprising at least a first field in the second portion of the plurality of fields, the first field containing an indication of a set of encryption mechanisms supported by the device;
    receiving a second message of the plurality of messages, the second message comprising a second field in the second portion of the plurality of fields, the second field containing an indication of a selected encryption mechanism from the set of encryption mechanisms; and
    sending a third message of the plurality of messages, the third message comprising at least a third field in the second portion of the plurality of fields containing content encrypted with the selected encryption mechanism, wherein the content of the third field comprises a statement of health concerning the device,
    wherein:
        the second message comprises a server certificate; and
        the method further comprises validating the certificate as corresponding to a server authorized by an administrator of the network to provide network credentials.

2. The method of claim 1, wherein the statement of health comprises information concerning configuration information relating to anti-virus capabilities of the device.

3. The method of claim 1, wherein the first message comprises a field in the first portion having content identifying the message as a discover message in the protocol.

4. The method of claim 1, wherein the second message comprises a field in the first portion having content identifying the message as an offer message in the protocol.

5. The method of claim 1, further comprising, selectively in response to the validating, requesting a network address from a server associated with the server security token.

6. The method of claim 1, further comprising:
    receiving a message comprising remediation information; and
    decrypting the remediation information.

7. The method of claim 1, wherein the protocol is Dynamic Host Configuration Protocol (DHCP) such that the first portion of the plurality of fields have content prescribed by the DHCP and the second portion of the plurality of fields having content that is optional under the DHCP.

8. The method of claim 1, wherein the third message further comprises a replay detection token.

9. A tangible computer-readable storage medium comprising computer-executable instructions adapted for execution on a networked device coupled to a network comprising a credential server that provides network credentials in accordance with a protocol comprising a plurality of messages, each message comprising a plurality of fields prescribed by the protocol, with a first portion of the plurality of fields having content prescribed by the protocol and a second portion of the plurality of fields having content that is not prescribed by the protocol, the computer-executable instructions, when executed, for:
    sending a first message of the plurality of messages, the first message comprising at least a first field in the second portion of the plurality of fields, the first field containing an indication of a set of encryption mechanisms supported by the device;
    receiving a second message of the plurality of messages, the second message comprising a second field in the second portion of the plurality of fields, the second field containing an indication of a selected encryption mechanism from the set of encryption mechanisms; and
    sending a third message of the plurality of messages, the third message comprising at least a third field in the second portion of the plurality of fields containing content encrypted with the selected encryption mechanism, wherein the content of the third field comprises a statement of health concerning the device,
    wherein:
        the second message comprises a server certificate; and
        the method further comprises validating the certificate as corresponding to a server authorized by an administrator of the network to provide network credentials.

10. The tangible computer-readable storage medium of claim 9, wherein:
    the protocol is Dynamic Host Configuration Protocol (DHCP) such that the first portion of the plurality of fields have content prescribed by the DHCP and the second portion of the plurality of fields having content that is optional under the DHCP.

11. The tangible computer-readable storage medium of claim 10, wherein the third message further comprises, in the second portion of the plurality of fields, a shared key, the computer-readable storage medium further comprising computer-executable instructions for:
    receiving a fourth message of the plurality of messages, the fourth message comprising at least a fourth field in the second portion of the plurality of fields, the fourth field containing content encrypted with the shared key; and
    with the shared key, decrypting content of the fourth field.

12. The tangible computer-readable storage medium of claim 11, wherein the content of the fourth field comprises a network address and the computer-readable medium further comprises computer-executable instructions for accessing the network using the network address.

13. The tangible computer-readable storage medium of claim 12, further comprising computer-executable instructions for:
    storing the server certificate; and
    renewing the network address by sending a fifth message of the plurality of messages, the fifth message comprising a fifth field in the second portion comprising content encrypted with a server key associated with the stored server certificate.

14. The tangible computer-readable storage medium of claim 10, further comprising computer-executable instructions for:
    collecting information about security software on the device.

15. The tangible computer-readable storage medium of claim 14, wherein the computer-executable instructions for collecting information about security software on the device comprise computer-executable instructions for collecting information about a firewall.

16. The tangible computer-readable storage medium of claim 14, wherein the computer-executable instructions for collecting information about security software on the device comprise computer-executable instructions for collecting information about at least one of anti-virus software and a state of operating system patches.

17. A method of operating a network comprising a networked device and a credential server that provides network credentials in accordance with a protocol comprising a plurality of messages, each message comprising a plurality of fields prescribed by the protocol, with a first portion of the plurality of fields having content prescribed by the protocol and a second portion of the plurality of fields having content that is not prescribed by the protocol, the method comprising:

sending from the networked device to the credential server a first message of the plurality of messages, the first message comprising, in the second portion of the plurality of fields, a certificate of the networked device, wherein the device certificate has an associated device public key;

sending, from the credential server to the networked device a second message of the plurality of messages, the second message comprising, in the second portion of the plurality of fields, a server certificate;

at the networked device:
  validating the identity of the server using the server certificate; and
  obtaining a server public key based on the identity of the server; and
  sending from the networked device a third message of the plurality of messages, the third message comprising, in the second portion of the plurality of fields, content encrypted with the server public key, the content including configuration information about the networked device.

18. The method of claim 17, further comprising:
at the credential server:
  validating, based on the configuration information, that the networked device has a security configuration in compliance with a network access policy; and
  sending a fourth message of the plurality of messages to the networked device, the fourth message comprising, in the first portion of the plurality of fields, a network address and related access information, and, in the second portion of the plurality of fields, information received from the networked device encrypted with the device public key.

19. The method of claim 17, wherein:
the method further comprises, at the credential server:
  determining, based on the configuration information, that the networked device has a security configuration that is out of compliance with a network access policy; and
  sending a fourth message of the plurality of messages to the networked device, the fourth message comprising, in the second portion of the plurality of fields, remediation information encrypted with the device public key.

20. The method of claim 19, further comprising:
at the network device:
  decrypting the encrypted remediation information; and
  upgrading security software based on the remediation information.

* * * * *